Oct. 27, 1931.    R. L. CARTER    1,829,393
COMBINED ROUTER AND SHAPER
Filed Oct. 28, 1929    3 Sheets-Sheet 1
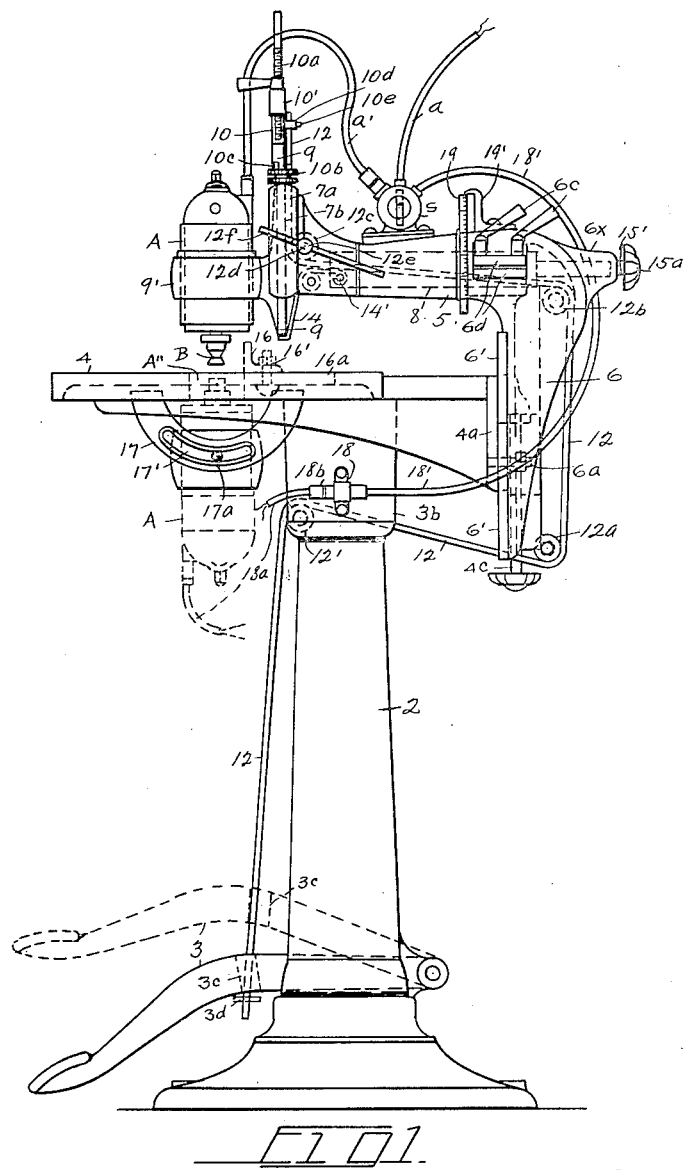
INVENTOR,
Ray L. Carter.
BY
Harry D. Wallace.
ATTORNEY.

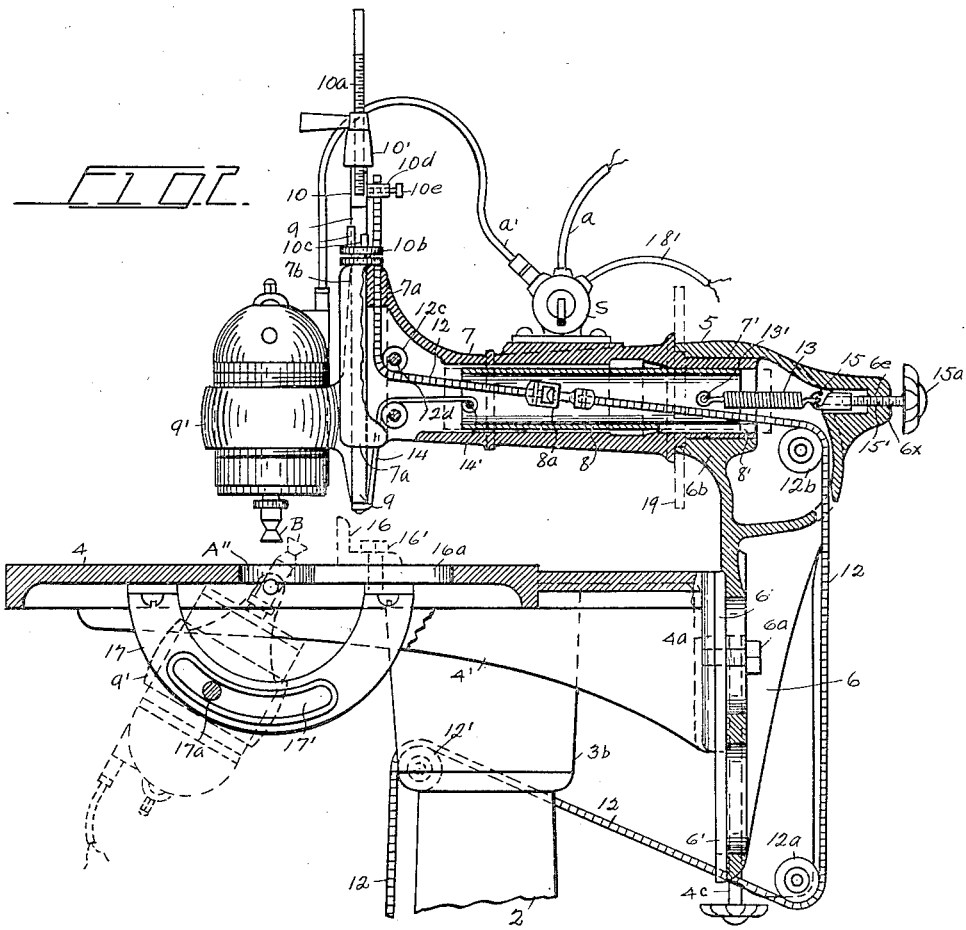

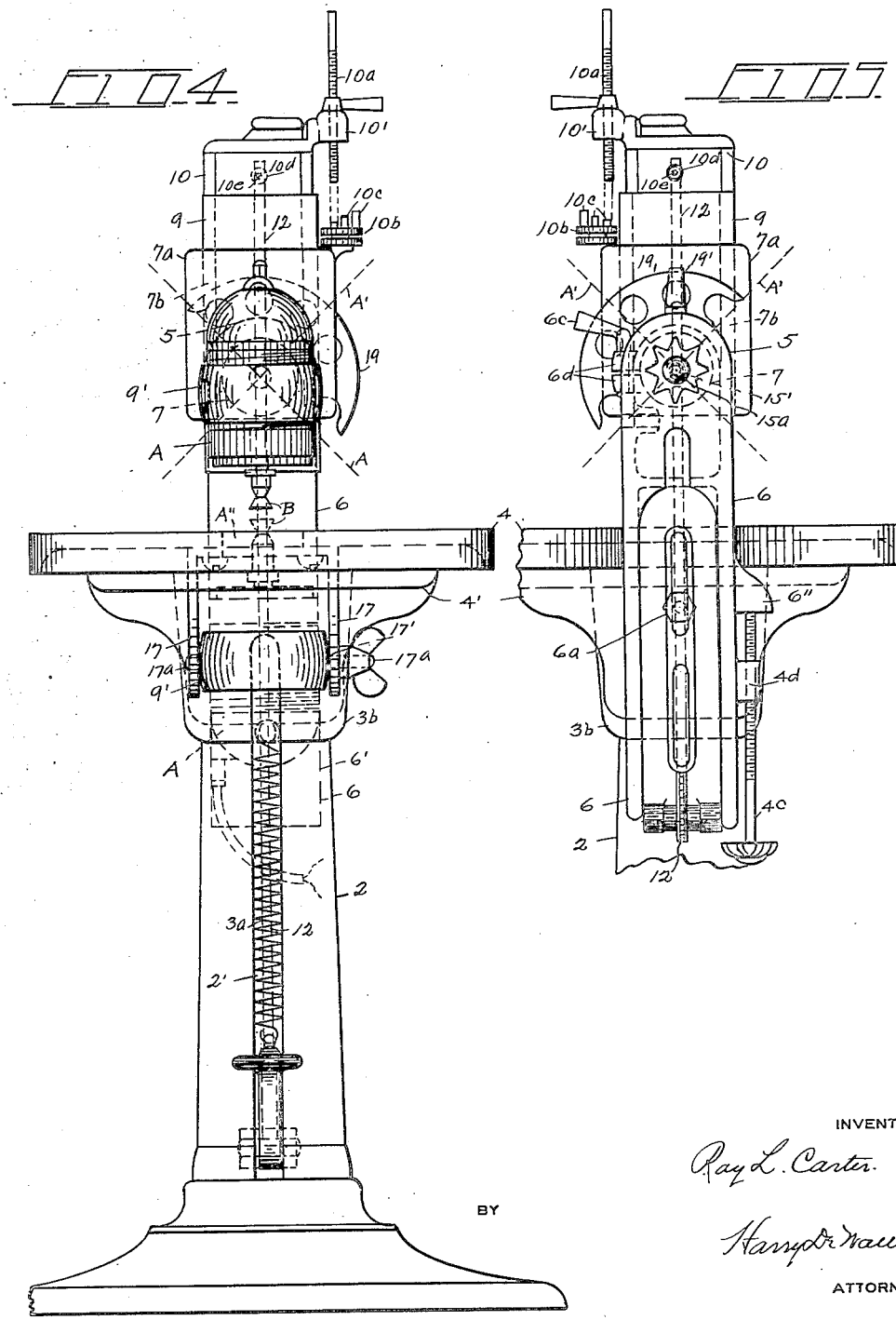

Patented Oct. 27, 1931

1,829,393

UNITED STATES PATENT OFFICE

RAY L. CARTER, OF PHOENIX, NEW YORK, ASSIGNOR TO THE STANLEY WORKS, OF NEW BRITAIN, CONNECTICUT, A CORPORATION OF CONNECTICUT

COMBINED ROUTER AND SHAPER

Application filed October 28, 1929. Serial No. 402,986.

This invention relates to a combined motor-driven router and shaper, and has for its object to provide a plane normally stationary table to support, and over which the work, is movable relatively to the tool, the table being mounted upon a pedestal, to position the router at suitable working height from the floor. A further object is to provide means for operatively supporting the router and shaper, said means comprising a sectional arm, one section being adjustably mounted rearwardly of the table for enabling said arm to be moved in a fixed vertical plane relatively to the table, the other section overhanging the table and being swiveled to the first section, to facilitate the rotation of the motor for positioning the tool for routing and shaping cuts in different directions radial to the axis of the horizontal section of said arm. A further object is to provide an adjustable head that directly supports the motor above the center of the table, said head being supported by and slidable in a way formed in the rotatable section of said arm. A further object is to provide a pedal supported by the pedestal, and chain-and-sprocket or other flexible means to connect the pedal with the said head for lowering the motor, to enable the tool to effect routing at different depths above the table. A further object is to provide means for adjustably mounting the motor inverted beneath the table for shaping work disposed upon the table. A further object is to provide means for gaging the depth of the routing and shaping work. And a further object is to generally improve and simplify the construction, arrangement, and operation of the routing mechanism shown and described in my United States Patent No. 1,718,275, dated June 25, 1929.

I attain these objects by the means set forth in the detailed description which follows and as illustrated by the accompanying drawings, in which—

Figure 1 is a side elevation of the combined machine. Fig. 2 is an enlarged broken side elevation, and partial central vertical section, the latter taken on line 2—2 of Fig. 3. Fig. 3 is a reduced top plan view. Fig. 4 is an enlarged front side elevation. And Fig. 5 is a broken rear elevation.

In the drawings, A represents an electric motor, by which the routing or shaping tool, as B, is driven, the motor being supplied with current by conductors $a$—$a'$ and an intervening switch $s$.

2 represents a hollow pedestal, that supports all the other parts of the machine at a convenient height from the floor, to enable the operator to stand while directing the routing and shaping work. The front side of the pedestal is preferably formed with a vertical slot 2', in the lower end of which is pivotally mounted a pedal 3, by which the motor may be moved relatively to the work. The pedal is normally held elevated, as shown in Figure 1, by a spring 3a, which is located within the pedestal, as shown in Fig. 4. 4 represents the work-supporting table, which is disposed in a plane at right angles to the axis of the pedestal and may be spaced therefrom by a hollow boss or leg 3b, that may be integral with either of said parts. The table 4 over-lies and is preferably rigid to a bracket 4', whose rear end projects beyond the table, and supports an inverted L-shaped member 5 comprising a vertical arm 6, and a horizontal arm 7 that over-lies the table and supports the motor A. The arm 6 is formed with a male guide member 6', that slidably engages a dove-tail groove or way 4a of the bracket 4', by which the member 5 may be raised and lowered relatively to the plane of the table, or may be rigid to the bracket, by the loosening or tightening of a bolt 6a, shown in Figs. 1, 2 and 5. The raising and lowering of the member 5 may be accomplished mechanically by means of a screw 4c, which is threaded into a lug 4d that is preferably integral with the rear end of the bracket 4', the top end of said screw engaging a stop lug 6'' that may form an integral part of the arm 6 of member 5, as shown in Figs. 1, 2 and 5. The end 7' of arm 7 preferably partially telescopes and is swiveled to the upper end 6b of arm 6, to enable the motor A to be swung or tilted for performing routing or shaping work at different angles to the vertical showing, as indicated by the oblique broken lines A' of Figs. 4 and 5. The arm 7 may be made rigid to the arm 6 by clamping screws 6c, which engage lugs 6d, as shown in Figs. 3 and 5. The arm 7 and the upper portion 6b of arm 6 are hollow, as shown in Fig. 2, and are both partially telescoped by a tubular plunger 8, the latter being rendered non-rotatable in arm 7 by a key 8' (see Fig. 2), the tube 8, however, may rotate with and also reciprocate independently of arm 7, as will be explained later on. The forward end of arm 7 is formed with an enlargement 7a having a dove-tail guide way 7b, that slidably receives a complementary member 9 of a vertically movable head, which comprises the said member and an integral cylinder holder 9', that supports the motor A and in which the latter is adjustable axially, by means of complementary threads (see Figs. 2, 3 and 4). By this arrangement, the motor may be moved vertically either by the guide or by the threaded connection of the motor and the holder 9', for positioning the tool B relatively to the work upon the table without disturbing the adjustment of member 5 at 4a—6'. Upon the top end of member 9 is mounted a bracket 10, having a bored and threaded portion 10', in which is adjustably mounted a threaded gage rod 10a, the latter being movable vertically towards and away from a rotatable depth indicator 10b which is supported by the enlargement 7a, the said member being fitted with a circular arrangement of upwardly facing gage studs, as 10c, of different height, that may be selectively disposed in the path of the rod 10a for accurately gaging the depth of the routing cuts, as best seen in Figs. 2, 3 and 4. The switch s is preferably mounted upon the top side of arm 7.

During the routing work, the motor may be lowered to effect the cutting by tool B, by the operator depressing the pedal 3, the latter being connected to the guide member 9 by a chain or cable 12. The lower end of the chain 12 passes through an opening 3c of the pedal and may be held in place by a pin 3d, shown in Fig. 1. The chain thence extends upwardly outside of the pedestal 2, to a socket 12' located in the leg 3b, thence rearwardly to a sprocket 12a which is supported by the lower end of arm 6 of member 5, from which the chain again extends upwardly and enters the hollow portion 6b of arm 6' in which is disposed another sprocket 12b. The chain thence extends forwardly through the tube 8 and arm 7 to a sprocket or sheave 12c, which is pivoted by a shaft 12d that extends transversely through said arm. From the sprocket 12c, the chain extends upwardly through the part 7a and its upper end is secured to a stud or boss 10d, which may be integral with the bracket 10, by a pin 10e. The shaft 12d projects beyond the arm 7 and is fitted with a capstan 12e, by which the motor A may be raised or lowered manually independently of the pedal 3 by the insertion of a hand-rod 12f. From the foregoing, it will be understood that whenever the pedal 3 is depressed, or the parts 12e—12f are rotated in the right direction, the pull on the chain 12 lowers the holder 9' and the motor A towards the work, and when the pull on the chain is relaxed, the motor is lifted away from the work towards its inoperative position of Figs. 1, 2 and 4, by the rearward movement of the plunger 8 effected by the tension of a spring 13 (see Fig. 2). To this end, the plunger 8 is connected to the lower end of the guide member 9 by a flexible strap 14, which thence extends upwardly into the hollow of arm 7 and its opposite end is secured to a pin 14', that passes through the forward end of the plunger 8. One end of the spring 13 is secured to a pin 13' that also passes through the plunger and its opposite end is attached to a hook 15 that is swiveled to a bolt 15', the latter being threaded in an opening 6e formed in a boss 6x of the arm 6. The bolt 15 is formed with a hand knob or head 15a, by which the spring 13 may be adjusted manually, for varying the tension of the spring. By this arrangement, the instant the operator releases the pedal, or manually operatable parts 12—12f, the plunger 8 is jerked rearwardly for raising the motor and related parts from the work on the table. In order to enable the arm 7 and the motor to be rotated on the axis of said arm for effecting angular routing cuts (see broken lines A'), without buckling or cramping the chain 12, the latter is preferably fitted with a turnbuckle, as 8a, which is conveniently disposed within plunger 8, as shown in Fig. 2. By this arrangement, the portion of the chain between the turnbuckle and the anchorage 10d, may twist relatively to the rest of the chain without interfering with its free travel over the sprockets 12b—12c. Owing to the small scale of the drawings, the chain 12 and the several sprockets are shown conventionally.

An important feature in the present invention is the provision of means for adjustably mounting the motor A or a second motor inverted beneath the table and projecting the tool B upwardly through an opening A'' (see Fig. 2), to effect various cuts in work that may be mounted upon the table and may be supported and guided by a gage member 16, which may be disposed on the plane top of the table, said member being adjustable towards and from opening A'', by means of a bolt 16', and a slot 16a that extends rearwardly from said opening, as shown in Figs. 1 and 2. The motor may be swingably supported in the inverted position (see Figs. 1, 2 and 4) by a bracket comprising spaced arc-shaped members 17 which are formed with concentric coinciding slots 17′ in which bolts or studs 17a attached to the motor holder 9′ plays. By this under-swung mounting for the motor, I am able to effect dove-tail and other shaping work that cannot be done by the motor when in its normal routing position above the table.

In order to supply the current to the inverted motor in a conveninet manner, I provided a socket 18, which may be mounted upon the leg 3b, and connect the socket with the switch s, by a conductor 18′. A conductor 18a, carrying a plug 18b, completes the connection between the switch and the inverted motor, as shown in Fig. 1.

Upon arm 7 is mounted a semi-circular scale 19 preferably graduated for 180°, which is rotatable with said arm, and with which is associated a fixed pointer 19′ carried by arm 6, for accurately indicating the different angles to which the motor A may be adjusted, in a well-known manner.

Having thus described my invention, what I claim, is—

1. A combined routing and shaping machine comprising a motor and a tool driven thereby, in combination with a pedestal and a table supported by the pedestal, a support for the motor comprising a member having a horizontal arm that overlies the table, and a vertical arm that over-laps the rear end of the table, said horizontal arm being rotatably supported by the vertical arm, a head to directly support the motor, guide means for rendering the head reciprocable at right angles to the axis of the horizontal arm, a plunger in said horizontal arm, means to connect the plunger with said head, tension means to move said plunger in the direction for raising the head and motor relatively to the table, and means independent of the plunger and of the means which connects the plunger and head and controlled by the operator for moving the motor and head towards the table.

2. In a device of the type set forth, a frame having a work table, a horizontal tubular member, means to mount the member on the frame for angular adjustments, a vertically slidable head on the member, a motor and a tool driven thereby carried by the head, a hollow plunger slidable within the member, spring means for tensioning the plunger, a flexible connection between one end of the head and the plunger to normally hold the head and thereby the tool in inoperative position, and manually operable means to move the head and thereby the tool to operative position including a flexible connection extending through the plunger and connected to the opposite end of the head and a device in the connection whereby upon turning the member and thereby the head the connection will be twisted.

3. In a device of the type set forth, a frame having a work table, a horizontal tubular member, means to mount the member on the frame, a vertically slidable head on the member, a motor and a tool driven thereby carried by the head, a hollow plunger slidable within the member, spring means for tensioning the plunger, a flexible connection between one end of the head and the plunger to normally hold the head and thereby the tool in inoperative position, and manually operable means to move the head and thereby the tool to operative position, including a flexible connection extending through the plunger and connected to the opposite end of the head.

4. In a device of the type set forth, a frame having a work table, a horizontally disposed member, means to mount the member on the frame, a vertically slidable head on the member, a motor and a tool driven thereby carried by the head, a horizontally slidable element carried by the member, spring means to tension the element, a flexible connection between one end of the head and the member for normally holding the head and thereby the tool in inoperative position, and manually operable means to move the head and thereby the tool to operative position including a flexible connection secured to the opposite end of the head.

5. In a device of the type set forth, a frame having a work table, a horizontally disposed member, means to mount the member on the frame, a vertically slidable head on the member, a motor and a tool driven thereby carried by the head, manually operable means, means connected to one end of the head and extending in part through the member and connected to the manually operable means to move the head in one direction, means connected to the opposite end of the head to move same in the opposite direction, and spring means in the member to tension the last named means.

6. In a device of the type set forth, a frame having a work table, a horizontally disposed member, means to mount the member on the frame, a vertically slidable head on the member, a motor and a tool driven thereby carried by the head, a tubular member in the member for moving the head in one direction, means to connect said tubular member to the head, spring means for tensioning the tubular member, and manually operable means for moving the head in the opposite direction having a part extending through the tubular member and connected to the head.

7. In a device of the type set forth, a frame having a work table, a horizontally disposed member having an axial bore, means to mount the member on the frame, a vertically slidable head on the member, a motor and a tool driven thereby carried by the head, tubular tensioned means in the bore of the member connected to the head to move same in one direction, and manually operable means having a part movable through the tubular means and connected to the head to move the latter in the opposite direction.

8. In a device of the type set forth, a frame having a work table, a horizontal member, means to mount the member on the frame, a vertically slidable head on the member, a motor and a tool driven thereby carried by the head, horizontally disposed tensioned means slidable in said member, means connected to said tensioned means and to one end of the head for moving the head at right angles to the member in one direction, and manually operable means completely independent of the tensioned means and connected to the opposite end of the head for moving the latter at right angles to the member and in an opposite direction.

In testimony whereof I affix my signature.

RAY L. CARTER.